(12) United States Patent
Rajapakse et al.

(10) Patent No.: US 9,973,290 B2
(45) Date of Patent: *May 15, 2018

(54) SYSTEM FOR MEDIA REBROADCASTING FOR SYNCHRONIZED RENDERING ACROSS MULTIPLE DEVICES

(71) Applicant: Blackfire Research Corporation, San Francisco, CA (US)

(72) Inventors: Ravi Rajapakse, San Francisco, CA (US); Ian McIntosh, San Francisco, CA (US)

(73) Assignee: Blackfire Research Corporation, San Francisco, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 15/381,092

(22) Filed: Dec. 15, 2016

(65) Prior Publication Data

US 2017/0104550 A1    Apr. 13, 2017

Related U.S. Application Data

(63) Continuation of application No. 15/285,489, filed on Oct. 5, 2016, now Pat. No. 9,780,894, which is a continuation-in-part of application No. 15/175,026, filed on Jun. 6, 2016, now abandoned, which is a continuation-in-part of application No. 15/047,548, filed on Feb. 18, 2016, now Pat. No. 9,843,489, which is a continuation-in-part of application No.
(Continued)

(51) Int. Cl.
*G06F 3/00* (2006.01)
*G06F 15/16* (2006.01)
*H04H 20/18* (2008.01)
*H04L 29/06* (2006.01)
*H04W 4/00* (2018.01)
*H04W 4/06* (2009.01)
*H04H 20/71* (2008.01)

(52) U.S. Cl.
CPC ............ *H04H 20/18* (2013.01); *H04H 20/71* (2013.01); *H04L 65/608* (2013.01); *H04W 4/008* (2013.01); *H04W 4/06* (2013.01)

(58) Field of Classification Search
None
See application file for complete search history.

(56) References Cited

U.S. PATENT DOCUMENTS

2005/0286546 A1    12/2005    Bassoli et al.
2008/0040759 A1    2/2008    She et al.
(Continued)

OTHER PUBLICATIONS

Alex Castle, The beginer's guide to game streaming with Twitch, Oct. 10, 2014, 1-9.*

*Primary Examiner* — Hyun Nam
(74) *Attorney, Agent, or Firm* — Galvin Patent Law LLC; Brian R. Galvin

(57) ABSTRACT

A system and method for media rebroadcasting for synchronized rendering across multiple devices, comprising a first media rendering device configured to receive media content from a media source and rebroadcast at least a portion of the media content to each of a plurality of second media rendering devices using the network interface, wherein each of the second media rendering devices renders its received media content synchronously with the rendering of the first media rendering device.

13 Claims, 12 Drawing Sheets

Related U.S. Application Data

14/505,411, filed on Oct. 2, 2014, now Pat. No. 9,338,208, which is a continuation of application No. 14/303,527, filed on Jun. 12, 2014, now Pat. No. 9,407,670, which is a continuation-in-part of application No. 14/083,426, filed on Nov. 18, 2013, now Pat. No. 8,762,580, which is a continuation of application No. 11/627,957, filed on Jan. 27, 2007, now Pat. No. 8,677,002, said application No. 14/505,411 is a continuation of application No. 14/303,502, filed on Jun. 12, 2014, now Pat. No. 9,413,799, which is a continuation-in-part of application No. 13/561,029, filed on Jul. 28, 2012, now Pat. No. 8,839,065.

(60) Provisional application No. 62/171,217, filed on Jun. 4, 2015, provisional application No. 62/117,899, filed on Feb. 18, 2015, provisional application No. 61/727,624, filed on Nov. 16, 2012, provisional application No. 60/766,573, filed on Jan. 28, 2006, provisional application No. 61/833,928, filed on Jun. 12, 2013, provisional application No. 61/833,927, filed on Jun. 12, 2013, provisional application No. 61/727,624, filed on Nov. 16, 2012, provisional application No. 61/512,924, filed on Jul. 29, 2011, provisional application No. 60/766,573, filed on Jan. 28, 2006.

(56) References Cited

U.S. PATENT DOCUMENTS

| | | |
|---|---|---|
| 2014/0057569 A1 | 2/2014 | Toivanen et al. |
| 2015/0120953 A1* | 4/2015 | Crowe .................. H04L 65/60 709/231 |
| 2017/0019197 A1* | 1/2017 | Rajapakse ............. H04H 20/18 |
| 2017/0019198 A1* | 1/2017 | Rajapakse ............. H04H 20/18 |
| 2017/0090846 A1* | 3/2017 | Verma .................. G06F 3/1431 |

* cited by examiner

SYSTEM FOR MEDIA REBROADCASTING FOR SYNCHRONIZED RENDERING ACROSS MULTIPLE DEVICES

CROSS-REFERENCE TO RELATED APPLICATIONS

The present application is a continuation of U.S. patent application Ser. No. 15/286,516, titled "SYSTEM FOR SYNCHRONOUS PLAYBACK OF MEDCIA USING A HYBRID BLUETOOTH™ AND WI-FI NETWORK", filed on Oct. 5, 2016, which is a continuation-in-part of U.S. patent application Ser. No. 15/175,026 titled "SYNCHRONIZED MULTI-DEVICE MOBILE GAMING", and filed on Jun. 6, 2016, which claims the benefit of, and priority to, U.S. provisional application Ser. No. 62/171,217 titled "SYNCHRONIZED MULTI-DEVICE MOBILE GAMING" filed on Jun. 4, 2015, and is also a continuation-in-part of U.S. patent application Ser. No. 15/175,026, titled SYNCHRONIZED MULTI-DEVICE MOBILE GAMING", and filed on Jun. 6, 2016, which is a continuation-in-part of U.S. patent application Ser. No. 15/047,548, titled "SYSTEM AND METHOD FOR SYNCHRONOUS MEDIA RENDERING OVER WIRELESS NETWORKS WITH WIRELESS PERFORMANCE MONITORING", and filed on Feb. 18, 2016, which claims the benefit of, and priority to, U.S. provisional patent application Ser. No. 62/117,899, titled "COMMON EVENT-BASED MULTIDEVICE MEDIA SYNCHRONIZATION AND QUALITY ANALYSIS", and filed on Feb. 18, 2015, and is also a continuation-in-part of U.S. patent application Ser. No. 14/505,411, titled "COMMON EVENT-BASED MULTIDEVICE MEDIA PLAYBACK", and filed on Oct. 10, 2014, now issued as U.S. Pat. No. 9,338,208, on May 10, 2016, which is a continuation of U.S. patent application Ser. No. 14/303,527, titled "Broadcasting media from a stationary source to multiple mobile devices over Wi-Fi", and filed on Jun. 12, 2014, now issued as U.S. Pat. No. 9,407,670 on Aug. 2, 2016, which is a continuation-in-part of U.S. patent application Ser. No. 14/083,426, titled "COMMON EVENT BASED MULTI DEVICE PLAYBACK", filed on Nov. 18, 2013, now issued as U.S. Pat. No. 8,762,580 on Jun. 24, 2014, and claims the benefit of, and priority, to U.S. provisional patent application Ser. No. 61/727,624, titled "COMMON EVENT-BASED MULTIDEVICE MEDIA PLAYBACK", and filed on Nov. 16, 2012. U.S. patent application Ser. No. 14/303,527, titled "Broadcasting media from a stationary source to multiple mobile devices over Wi-Fi", and filed on Jun. 12, 2014, now issued as U.S. Pat. No. 9,407,670 on Aug. 2, 2016, also claims the benefit of, and priority to, U.S. provisional patent application Ser. No. 61/833,928, titled "Synchronous playback of media using a Wi-Fi network with the media originating from a Bluetooth source" and filed on Jun. 12, 2013, the entire specifications of each of which are incorporated herein by reference in their entirety. U.S. patent application Ser. No. 14/505,411, titled "COMMON EVENT-BASED MULTIDEVICE MEDIA PLAYBACK", and filed on Oct. 10, 2014, now issued as U.S. Pat. No. 9,338,208, on May 10, 2016, is also a continuation of U.S. patent application Ser. No. 14/303,502, titled "SYNCHRONOUS PLAYBACK OF MEDIA USING A WI-FI NETWORK WITH THE MEDIA ORIGINATING FROM A BLUETOOTH SOURCE", filed on Jun. 12, 2014, now issued as U.S. Pat. No. 9,413,799 on Aug. 9, 2016, which claims the benefit of, and priority to, U.S. patent application Ser. No. 61/727,624, titled "COMMEN EVENT BASED MULTIDEVICE MEDIA PLAYBACK", and filed on Nov. 16, 2012, and is also a continuation-in-part of U.S. patent application Ser. No. 13/561,029, titled "PACKET LOSS ANTICIPATION AND PRE EMPTIVE RETRANSMISSION FOR LOW LATENCY MEDIA APPLICATIONS" filed on Jul. 28, 2012, now issued as U.S. Pat. No. 8,839,065 on Sep. 16, 2014, which claims the benefit of, and priority to, U.S. provisional patent application Ser. No. 61/512,924, titled "Techniques for broadcasting media over a local network to multiple destinations", and filed on Jul. 29, 2011, and is also a continuation-in-part of U.S. patent application Ser. No. 11/627,957, titled "STREAMING MEDIA SYSTEM AND METHOD" and filed on Jan. 27, 2007, now issued as U.S. Pat. No. 8,677,002 on Mar. 18, 2014, which claims the benefit of, and priority to, U.S. provisional patent application Ser. No. 60/766,573, titled "A technique for streaming audio and multimedia over a wireless network", and filed on Jan. 28, 2006, the entire specification of each of which is incorporated herein by reference in their entirety.

BACKGROUND OF THE INVENTION

Field of the Art

The disclosure relates to the field of multimedia playback, and more particularly to the field of broadcasting constituent parts of multimedia content to mobile multimedia rendering devices.

Discussion of the State of the Art

Today there are many mobile devices such as multimedia players, smartphones, tablet computers, or other various mobile electronic devices, that have the ability to play media to a wireless playback device (such as a speaker, stereo receiver, or television) over a radio-based wireless link using BLUETOOTH™ or Wi-Fi wireless data transmission protocols. The BLUETOOTH™ or Wi-Fi mediated transmission of media such as audio or multimedia such as a digital movie, show or concert, both video and audio going to the same rendering device, is quite commonplace. However, a user might desire to broadcast media to multiple devices with differing wireless capabilities, such as a mixture of BLUETOOTH™ and Wi-Fi speakers. Ordinarily, this would not be possible as a broadcast can only utilize a single wireless radio or other transmission means at any given time, so the user would be restricted to only using the speakers that share similar wireless capabilities. Further, the transmission range and connection modality of BLUETOOTH™ is such that it is not usable to allow a group of people to experience media on their individual devices. However, BLUETOOTH™ is very prevalent in mobile device hardware (such as in smartphone radio hardware), so it may be convenient to play using BLUETOOTH™ to a first playback device such as using a smartphone and then have this first playback device play to one or more additional playback devices, using Wi-Fi that provides longer range and greater information bandwidth, allowing the devices to be placed much further apart and play in high resolution. Low latency transport of media over Wi-Fi and media playback synchronization over Wi-Fi presents many challenges that the invention aims to solve, as described herein.

What is needed in the art is a system and method for synchronous playback of media content using a hybrid BLUETOOTH™ and Wi-Fi network, comprising a plurality of wireless media receivers and a media synchronization component, wherein media content is received at a first media receiver via BLUETOOTH™ and the first media receiver transmits at least a portion of the received media content to a plurality of second media receivers via a Wi-Fi network, wherein the first media receiver renders at least some of the media content and manages synchronization using its media synchronization component; and wherein each second media receiver renders the media content it receives synchronously with the first media receiver using their respective media synchronization components.

Further, what is needed, is a system for synchronous playback of media using a hybrid BLUETOOTH™ and Wi-Fi network, comprising a media source stored in a memory of and operating on a processor of a first network connected electronic device, and configured to communicate via BLUETOOTH™; and a plurality of media receivers each respectively stored in a memory of and operating on a processor of an additional network-connected electronic device, each configured to operate a media synchronization component and configured to communicate via a Wi-Fi network; wherein the media source transmits media content to a first media receiver via BLUETOOTH™; wherein the first media receiver receives the media content from the media source via BLUETOOTH™ and transmits at least a portion of the received media content to a plurality of second media receivers via the Wi-Fi network; and wherein each second media receiver is configured to render the media content it receives synchronously with the first media receiver using a media synchronization component.

SUMMARY OF THE INVENTION

Accordingly, the inventor has conceived and reduced to practice, in a preferred embodiment of the invention, a system for media rebroadcasting for synchronized rendering across multiple devices, comprising a first media rendering device configured to receive media content from a media source and rebroadcast at least a portion of the media content to each of a plurality of second media rendering devices using the network interface, wherein each of the second media rendering devices renders its received media content synchronously with the rendering of the first media rendering device. The following non-limiting summary of the invention is provided for clarity, and should be construed consistently with embodiments described in the detailed description below.

According to a preferred embodiment of the invention, a system for media rebroadcasting for synchronized rendering across multiple devices, comprising: a first media rendering device comprising a memory, a processor, and a network interface; wherein media content is received at the first media rendering device from a media source; wherein the first media rendering device rebroadcasts at least a portion of the received media content to each of a plurality of second media rendering devices using the network interface; wherein the first media rendering device renders at least some of the media content; and wherein each second media rendering device renders the media content it receives in synchronization with the rendering of the first media rendering device, is disclosed.

According to another preferred embodiment of the invention, a method for media rebroadcasting for synchronized rendering across multiple devices, comprising the steps of: receiving, at a first media rendering device comprising a memory, a processor, and a network interface, media content from a media source; rebroadcasting, from the first media rendering device using the network interface, at least a portion of the received media content to each of a plurality of second media rendering devices, each comprising a memory, a processor, and a network interface; rendering, using the first media rendering device, at least a portion of the received media content; and rendering, synchronously with the rendering of the first media rendering device, the media content received at each second media rendering device, is disclosed.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
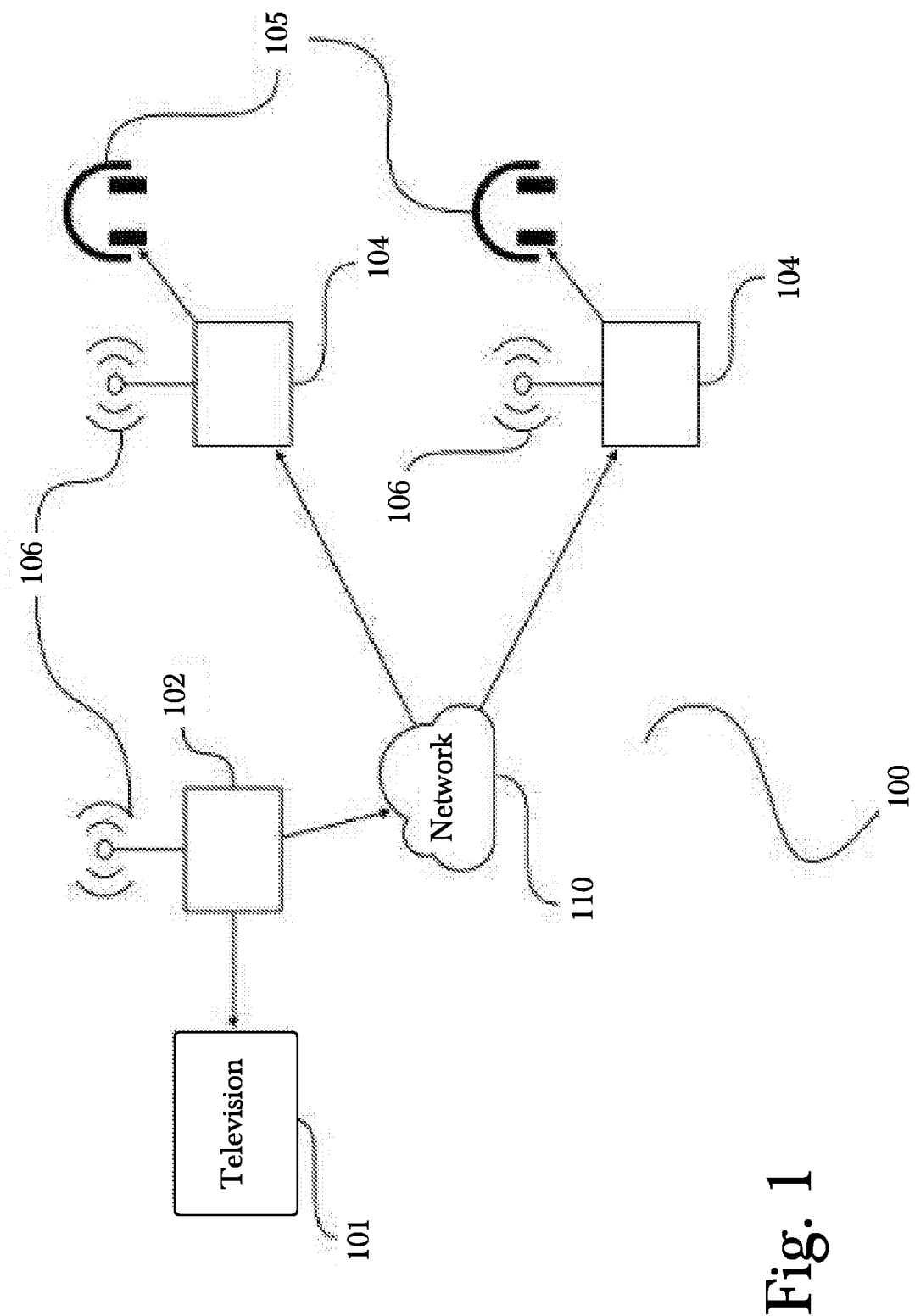
FIG. 1 is a system architecture diagram, illustrating an exemplary system for synchronized media broadcast to multiple receiver devices, according to a preferred embodiment of the invention.

The inventor has conceived and reduced to practice, in a preferred embodiment of the invention, a system and method for synchronized media broadcast to multiple receiver devices, that enables the broadcast of portions of a media stream (or multiple separate streams) to different receiver devices simultaneously.

Additionally, the inventor has conceived and reduced to practice, in a preferred embodiment of the invention, a system and method for synchronized media broadcast from a mobile source which enables the use of varying receiver devices that may be positioned across a wide distance that would not ordinarily be possible using traditional broadcast means.

Additionally, the inventor has conceived, and reduced to practice, in a preferred embodiment of the invention, a system and method for playing media content from a BLUETOOTH™ enabled media content rendering device to a plurality of Wi-Fi connected rendering devices through a centralized BLUETOOTH™ enabled and Wi-Fi playback control device.

Accordingly, the inventor has conceived and reduced to practice, in a preferred embodiment of the invention, a system for synchronous playback of media using a hybrid BLUETOOTH™ and Wi-Fi network, comprising a plurality of wireless media receivers and a media synchronization component, wherein media content is received at a first media receiver via BLUETOOTH™ and the first media receiver transmits at least a portion of the received media content to a plurality of second media receivers via a Wi-Fi network, wherein the first media receiver renders at least some of the media content and manages synchronization using its media synchronization component; and wherein each second media receiver renders the media content it receives synchronously with the first media receiver using their respective media synchronization components.

According to a preferred embodiment of the invention, a system for synchronous playback of media using a hybrid BLUETOOTH™ and Wi-Fi network, comprising a media source stored in a memory of and operating on a processor of a first network connected electronic device, and configured to communicate via BLUETOOTH™; and a plurality of media receivers each respectively stored in a memory of and operating on a processor of an additional network-connected electronic device, each configured to operate a media synchronization component and configured to communicate via a Wi-Fi network; wherein the media source transmits media content to a first media receiver via BLUETOOTH™; wherein the first media receiver receives the media content from the media source via BLUETOOTH™ and transmits at least a portion of the received media content to a plurality of second media receivers via the Wi-Fi network; and wherein each second media receiver is configured to render the media content it receives synchronously with the first media receiver using a media synchronization component, is disclosed.

According to another preferred embodiment of the invention, a method for synchronous playback of media using a Wi-Fi network with media originating from a BLUETOOTH™ source, comprising the steps of receiving via BLUETOOTH™, at a first wireless media receiver comprising a memory, a processor, a wireless network interface, and a media synchronization component, media content from a media source; rendering, using the first wireless media receiver, at least a portion of the received media content; transmitting, from the first wireless media receiver, at least a portion of the received media content to a plurality of second wireless media receivers, each comprising a memory, a processor, a wireless network interface, and a media synchronization component, via a Wi-Fi network; and rendering, synchronously with the first wireless media device, the media content received at each second wireless media device; wherein synchronization is accomplished using the respective media synchronization components, is disclosed.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

FIG. 1 is a system architecture diagram, illustrating an exemplary system 100 for synchronized media broadcast to multiple receiver devices, according to a preferred embodiment of the invention. According to the embodiment, a television 101 may be connected to a media output of a set top box 102 (such as a cable or satellite receiver, cassette or disc player, or other appropriate media device). The set top box 102 may be connected to a media source 101 such as cable TV, satellite TV or internet-based media source, or any other suitable media source or combination of sources. The set top box 102 may also be network-enabled, such that it may connect to a network 110 such as the Internet (via either wired or wireless means as appropriate, according to the nature and capabilities of the device), and may transmit and receive data messages via a network interface 106 such as a wireless antenna or Ethernet cable. In some embodiments, the TV 101 may be a "smart TV" with some or all of the capabilities of the set top box 102 (such as the ability to receive satellite or cable TV signals or internet access) included as an integral feature. It should be appreciated that the term "set top box" is used herein to refer to any traditional cable or satellite receivers and may also refer to additional or alternate devices that connect to a TV such as networked media devices. A TV 101 and set top box 102 together, or a smart TV 101, may be considered a media source according to the embodiment. In most arrangements, such devices are typically stationary and not very close to a viewer.

According to the embodiment, one or more mobile devices 104 may be connected to the network 110 such as via a common wireless network protocol such as Wi-Fi, using appropriate network interfaces (such as a Wi-Fi radio) 106. Each mobile device 104 may be connected to an audio rendering device 105 such as a speaker or headphones (or any other suitable device for receiving or playing audio). The audio device 105 may be integral to or a component of the mobile device 104, such as an integral speaker, or it may be external to the mobile device 104 such as a pair of removable headphones. It should be appreciated that a mobile device 104 may be any suitable mobile electronic device, such as including (but not limited to) a smartphone, tablet computer, personal media player, network-capable wired or wireless earphones or speakers, or any other such mobile device that may be used to store, receive, play, or otherwise utilize media information. It should also be appreciated that there may be many such mobile devices being utilized in a joint configuration, such as in a home theater arrangement where there may be a multi-channel arrangement of speakers, for example to achieve "surround sound", or as with multiple viewers of the same video content on a TV. Mobile devices 104 and audio rendering devices 105 may together be considered mobile media receivers according to the embodiment. These devices are typically mobile and very close to a user or viewer. In a surround sound arrangement, such as that described above, each speaker may render one channel of audio, whereas in a singular configuration (that is, playing media via a single device rather than multiple devices used jointly) all channels are played via the same device resulting in lost audio fidelity.

According to the embodiment, a video portion of a media stream may be rendered on a television 101 that is connected to a set top box 102. The set top box 102 may simultaneously transmit an audio portion of the media over a network to one or more mobile devices 104. The mobile devices 104 may receive an audio portion of media and render the audio to an appropriate audio output device 105 such as a connected pair of earphones, headphones, or an integral speaker. In order for media to be rendered simultaneously and in phase (that is, all devices playing media in a synchronous fashion such that each device is consistently playing media simultaneously and at the same rate), each device may implement a media synchronization mechanism, such as that described in a COMMON EVENT synchronization mechanism. This synchronization of playback requires a rendering adjustment at the rendering device. Since the rendering device in this application is a smartphone and there is limited control of the smartphone hardware, the synchronization technique described in a COMMON EVENT mechanism is particularly appropriate as it does not require low level hardware control.

In order for a TV 101 to broadcast audio simultaneously to multiple mobile devices 104 while playing the same media channels (e.g. stereo) on all mobile devices, media may be either multicast over the network 110 to the mobile devices 104 (that is, a single media source may be simultaneously broadcast to multiple devices from the source device 101, in this case the TV 101 or set top box 102) or media samples or frames may be copied for each playback device and each copy may then be unicast over the network 110 to each mobile device 104 (that is, a separate identical media content may be individually broadcast to each device for playback). For such an approach to work effectively, it is critical that any delay in rendering an audio portion of media via mobile devices be very low such that audio rendering at the audio device 105 stays in sync with the respective video portion of the media being played on the TV 101 screen.

In additional situations, a TV 101 (or other media source) may broadcast a video portion of media content to a mobile device 104 as well as an audio portion, allowing a user to view both parts of the media on the mobile device 104 (rather than splitting the media into streams being broadcast and played on different devices, as described above). For example, a mobile device 104 may be a smartphone that receives both audio and video media from the TV 101 and renders both media channels on the smartphone. This allows a user to see the video close up and use an audio device 105 such as a pair of connected headphones to hear the audio, effecting a personal media experience that will not disturb others nearby or affect their own media playback. Furthermore, it will be appreciated that the TV 101 may broadcast media to many mobile devices such as for multiple viewers in a viewing room, or to separate locations connected via the network 110 such as for multiple users viewing media from separate locations (for example, a family watching a movie together from different rooms of a house).

Figure 3:
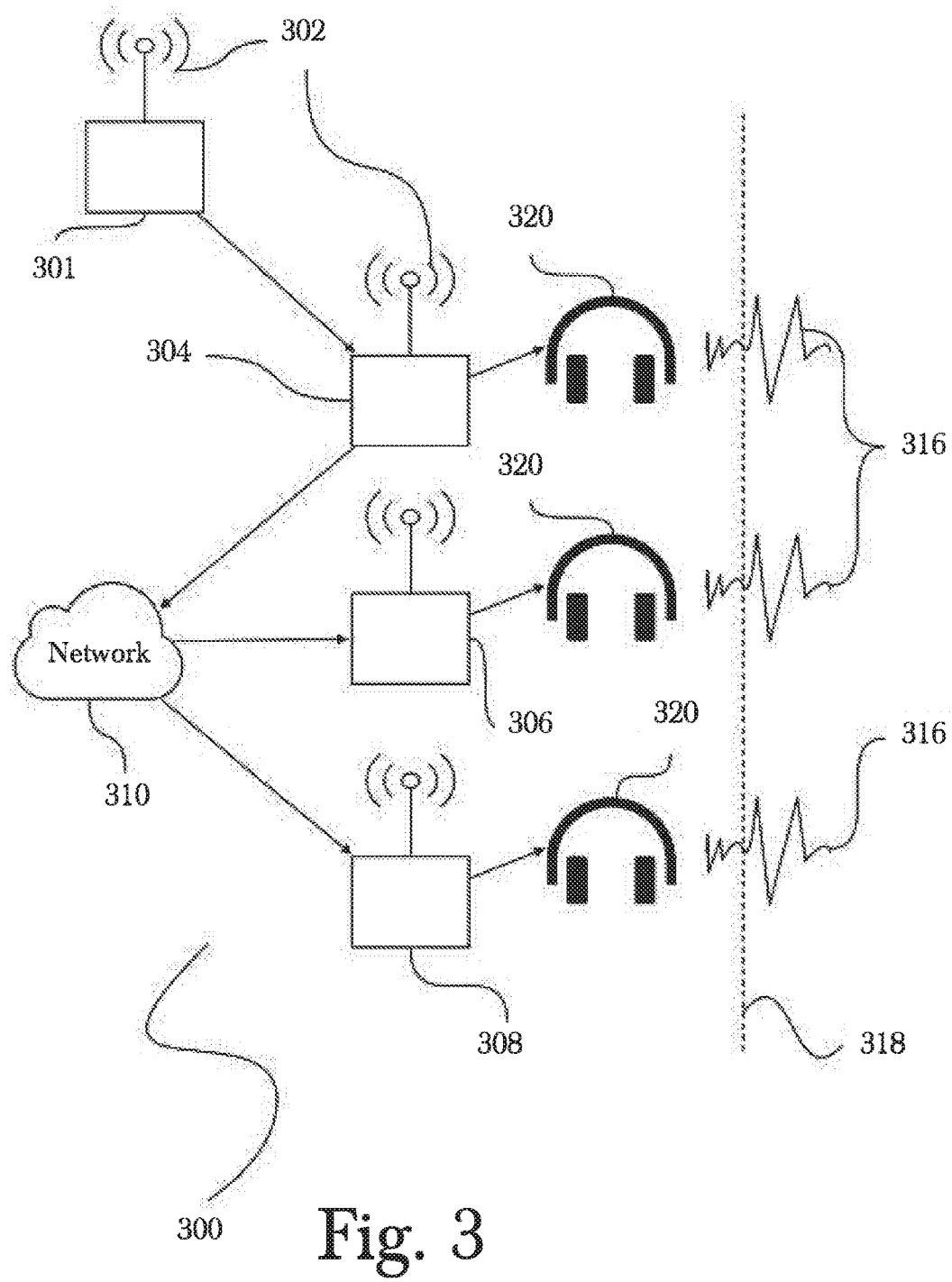
FIG. 3 is a system architecture diagram, illustrating an exemplary system for media broadcast over a large network according to a preferred embodiment of the invention.

FIG. 3 is a system architecture diagram, illustrating an exemplary system 300 for media broadcast over a large network (for example Wi-Fi) according to a preferred embodiment of the invention. The system 300 consists of a media source 301 which may be a phone, including all types of phones (smartphones, tablets) or mobile devices or other computing devices connected to a first playback device 304 by, for example, a BLUETOOTH™ wireless connection or other connectivity means. Additional playback devices 306, 308 may also be present in the system 300 and all playback devices are connected via a Wi-Fi or Ethernet IP-based network 310, as shown. It should be appreciated that a media source may connect to a network that is also connected to a playback device (such as a home network, for example), or it may connect directly to a network-capable playback device such as a television or speaker, or any combination thereof interchangeably. In this manner a variety of network and playback configurations may be possible according to the invention, utilizing a variety of devices and connectivity means simultaneously or interchangeably as appropriate. Each playback device may include or be connected to an audio or video component for rendering media. FIG. 3 shows each device including an audio rendering device 320 such as a headphone, as an audio component for rendering audio, but it should be appreciated that a variety of arrangements are possible and may be utilized according to the invention. A media source 301 may play media, which may be sent over a network connection 302 (such as a wired or wireless connection, for example Ethernet, Wi-Fi, or BLUETOOTH™) to a first playback device 304. The first playback device 304 may then send media to additional playback devices 306, 308 over the network 310. All playback devices may then render the media originating from the media source 301 simultaneously and in phase. The figure shows a representative audio wave 316 being played with the waves 316 being in phase 318.

The first playback device 304 may contain, for example, both a BLUETOOTH™ radio and a Wi-Fi radio (or any other arrangement of more than one network connectivity means). The other devices may contain one or more identical connectivity means as well, but these are not used for playback, for example, due to being outside of a broadcast range (for any particular connection means) relative to the media source 301. The media source 301 may be any computing device including, for example, a cloud media source such as an Internet media streaming service (such as NETFLIX™ or YOUTUBE™), residing on the Internet and connected to the first playback device 304 via a network 310. The media received by the first playback device 304 may be pushed to the first playback device 304 from the media source 301 or the first playback device 304 may pull/request media from the media source 301. In order for media to be rendered simultaneously and in phase, each playback device may implement a media synchronization mechanism, such as a COMMON EVENT synchronization mechanism referred to above, to keep playback coordinated across multiple playback devices. Playback devices may implement other synchronization mechanisms in alternate arrangements.

Media received at a first playback device 304 over the network 310 connection may be processed by software stored and operating on the first playback device 304 such that media is either multicast over the network 310 to additional playback devices 306/308 or media samples or frames may be copied for each playback device such that each copy may then be unicast over the network 310 to each individual playback device 306/308 separately. Media received at the first playback device 304 may also be received from other sources such as from a media input jack, such as, for example, an analog or digital audio jack on device 304. In such a case, media from the input jack, similar to the BLUETOOTH™ case, may be played locally on the first playback 304 device and also be forwarded to additional playback devices 306/308 where all devices synchronously play media. This may operate in a similar fashion as the BLUETOOTH™ case described previously, but media is received from the input jack (or other suitable direct input). The media source 301 or the first playback device 304 may include a mechanism to select all other playback devices or a subset thereof to be used in playback of media.

Figure 5:
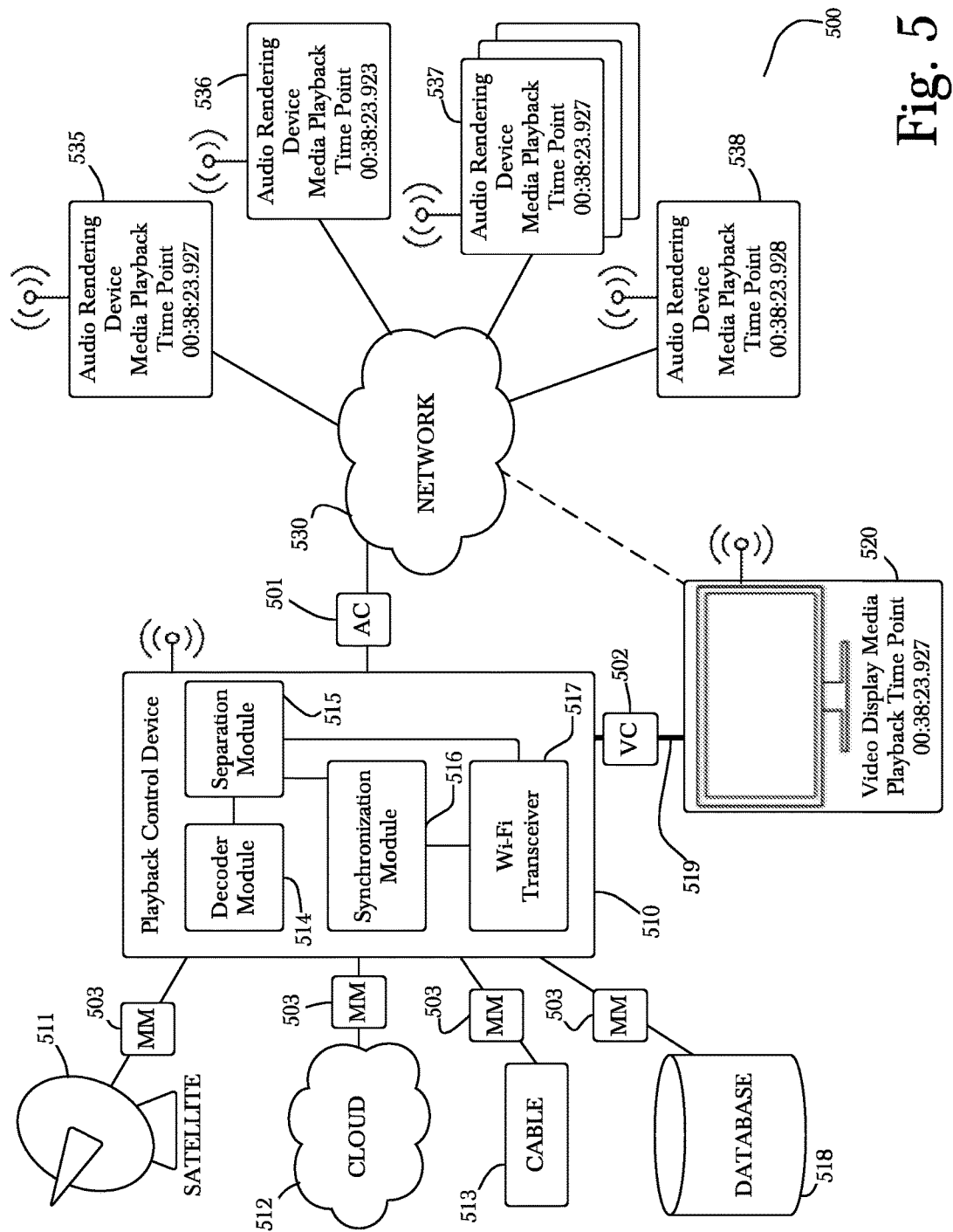
FIG. 5 is a block diagram, illustrating an exemplary system architecture for a system to play audio media content on a plurality of Wi-Fi connected audio rendering devices synchronized with video media content being rendered on a centralized display device, according to a preferred embodiment of the invention.

FIG. 5 is a block diagram illustrating an exemplary system architecture for a system 500 configured to play audio media content 501 on a plurality of Wi-Fi connected audio rendering devices, such as wireless headphones, which may include a microphone 535, a plurality of speakers 536, a surround sound system 537 or a smartphone 538, synchronized with video being rendered on a video display 520 through a centralized playback control device 510, according to a preferred embodiment of the invention. Multimedia content 503, made up of both video component 502 data and multi-track audio media content 501 data, may be received by a Wi-Fi connected playback control device 510 such as, but not limited to, a cable or satellite set top box, an internet connected multimedia appliance, or a smart TV, from one of a plurality of sources, examples of which are, but not limited to satellite 511, cable 513, external persistent storage, such as a hard drive or other database 518, or from a cloud-based source 512. Inside the Wi-Fi connected playback control device 510, audio media content 501 and video components 502 may need to be decoded or transcoded from an encoding format used for transporting multimedia content 503 into a format used for presentation using programming present in a decoder module 514. Multimedia content 503 may be separated into a video component 502 and an audio media content 501 component, which may be mono or stereo, stereo meaning at least two channels, using a separation module 515 such that the video component 502 may be routed to and rendered upon at least one video display 520 while the audio media content 501 may be broadcast over a network 530 by a Wi-Fi transceiver 517 to one or more audio rendering devices of possibly different configurations 535/536/537/538 for audio playback. Audio rendering devices 535/536/537/538 join network 530 to receive audio media content 501 by sending a specialized discovery initiation signal which Wi-Fi connected playback control device 510 then uses to, amongst other things, add new audio rendering devices 535/536/537/538 to a list of subscribed devices, and to determine how many audio channels an audio rendering device 535/536/537/538 possesses for example two channels (stereo, 535/536/538), or six channels 537 (surround) or even one channel (mono, not depicted). An important aspect of multimedia playback (video and audio) is that video and audio delivery be synchronized, such that both visual and audio portions of a scene occur nearly simultaneously, meaning, within very low latency tolerances, not noticeable to live users of the system 500. The playback control device 510 accounts for this by polling all subscribed audio rendering devices 535/536/537/538 with a propagation timing signal which, in part, includes synchronization module's 516 internal clock timestamp. Once broadcast out to all of the subscribed content rendering devices 535/536/537/538, the subscribed content rendering devices 535/536/537/538 respond with a propagation time offset response which may include a difference between the synchronization module's 516 timestamp and each respective audio content rendering devices 535/536/537/538 internal clock. The largest propagation time offset sent back to the playback control device 510 is taken to be the longest signal propagation time on the network 530. Playback at each respective audio content rendering device 535/536/537/538 is then offset using an equation (longest propagation offset minus propagation offset of current media content rendering device). Synchronization is denoted within the FIG. 5 by a media playback time point associated with each device 520/535/536/537/538, which, in this example, all play their respective content within ⁵⁄₁₀₀₀ths of a second: 00:38:23.923-00:38:23.928). Once synchronization is achieved, synchronized playback may be maintained by methods such as, but not limited to, a common event mechanism. Propagation signal to response receipt traversal times may be used to measure network signal propagation times, if needed, for example, due to internal clock time mismatches between subscribed network devices. Video display 520 may connect directly by way of a hardwire connection 519 to the Wi-Fi connected playback control device 510. The playback control device may be a set top appliance integral or appended to video display 520, or it may be a stand-alone appliance, and in either case may be configured to connect to a network 530 and a video display 520 either by a hardwire connection 519 or wirelessly over network 530, in which case, a propagation signal offset to video display 520 may also be propagated (denoted on FIG. 5 as a dotted line connection to network 530) as may be done with audio content rendering devices 535/536/537/538 to assure synchronized playback. It should not be discounted that, if desired, the playback control device 510 may also direct the entire multimedia content 503, as both video component 502 and audio media content 501 component collectively to a rendering device that may be configured to render both audio and video, such as, for example, a smartphone, a smart TV, or a video display with at least one built-in speaker, should such a configuration be required.

Figure 6:
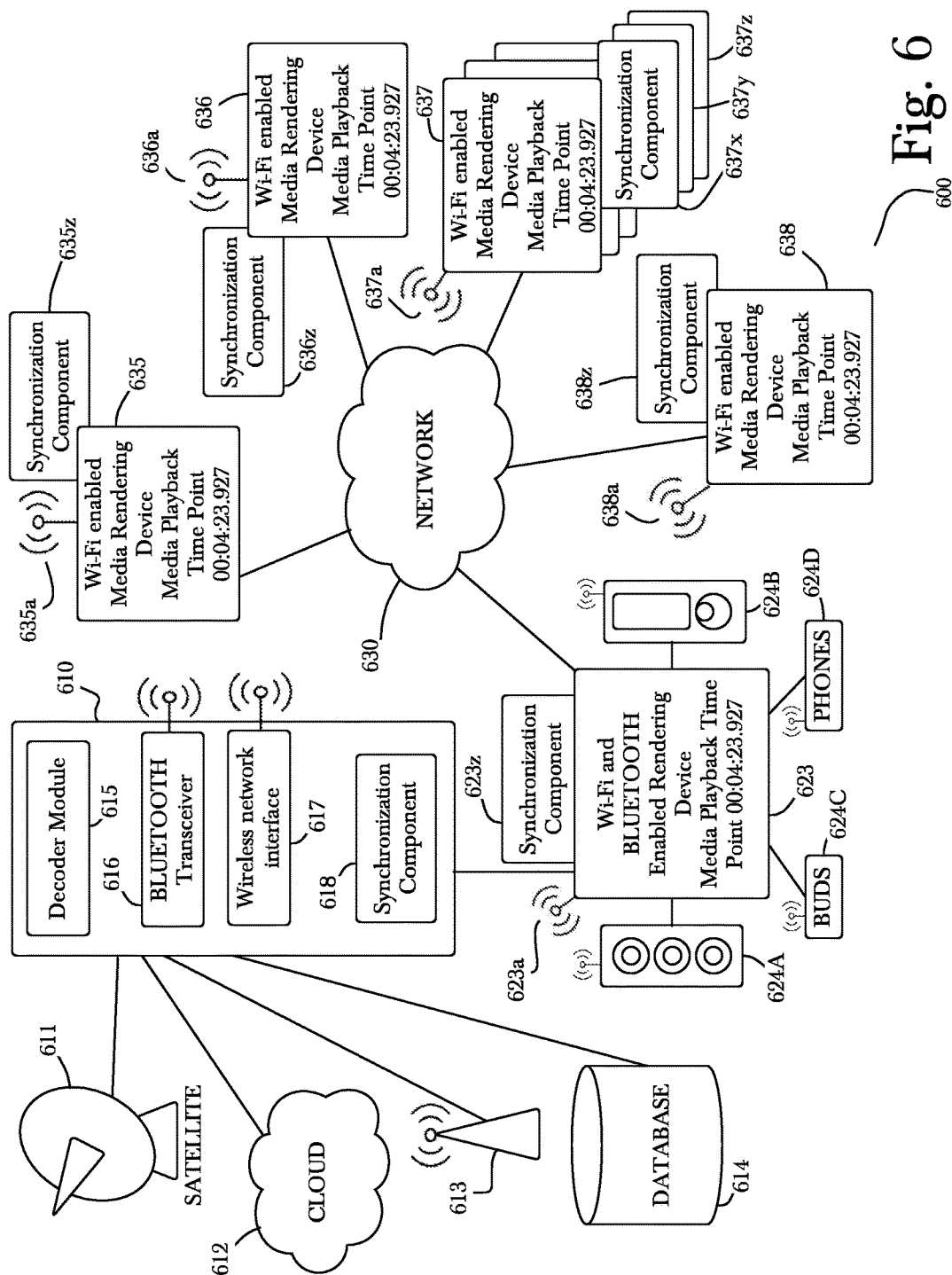
FIG. 6 is a block diagram, illustrating an exemplary system architecture for a system to play media content from a BLUETOOTH™ enabled media content source on a plurality of Wi-Fi connected rendering devices synchronized to all play the media content at the same time, according to another preferred embodiment of the invention.

FIG. 6 is a block diagram, illustrating an exemplary system architecture for a system 600 configured to play media content from a BLUETOOTH™ enabled media content source 610 through a BLUETOOTH™ and Wi-Fi enabled media rendering device 623 on a plurality of BLUETOOTH™ connected rending devices, such as speakers 624A/B, wireless ear buds 624C or wireless earphones 624D and Wi-Fi connected media rendering receivers 635/636/637/638, synchronized to all play the media content simultaneously, according to a preferred embodiment of the invention. The BLUETOOTH™ enabled media content source 610 may receive media content from at least one source, and may be configured to receive media content from a plurality of sources, which may include, for example, satellite connections 611, conventional antennae 613, music or video repositories in a cloud service 612 or persistent storage devices such as flash memory of hard drives or other such database 614, either internal or external to BLUETOOTH™ enabled media content source 610. The BLUETOOTH™ enabled media content rendering device 610 may contain a decoder module 615, as in some cases, manipulation may need to be performed on a source's 611/612/613/614 media content data stream prior to playback, and at least a BLUETOOTH™ transceiver 616, a wireless network interface 617, and a synchronization component 618. The BLUETOOTH™ enabled media content rendering device 610 may transmit media content to a Wi-Fi and BLUETOOTH™ enabled rendering device 623 comprising at least a wireless network interface 623a and a synchronization component 623z. The Wi-Fi and BLUETOOTH™ enabled rendering device 623 may communicate via a network 630 with a plurality of Wi-Fi enabled rendering devices, such as a single channel speaker 635, which also comprises a wireless network interface 635a and a synchronization component 635z; a stereo speaker 636 with its wireless network interface 636a and synchronization component 636z; a multi-channel speaker system 637 with its associated wireless network interface 637a and synchronization components 637x/y/z, or a mobile computing device, such as, for example, a smart phone 638 with its associated wireless network interface 638a synchronization components 638z. The Wi-Fi and BLUETOOTH™ enabled rendering device may transmit media content to at least one auxiliary BLUETOOTH™ rendering device, such as, for example, a set of BLUETOOTH™ wireless head phones 624C, or BLUETOOTH™ wireless ear buds 624D, or BLUETOOTH™ wireless speakers 624A/624B. Additionally, because BLUETOOTH™ has a relatively short usable transmission range, sharing with a group of directly paired devices is limited due to quantity of devices and range of said devices from a source, such as BLUETOOTH™ enabled media content source 610. However, use of the Wi-Fi and BLUETOOTH™ enabled media content rendering device 623 overcomes this severe limitation, by receiving a source output via BLUETOOTH™ and then retransmitting it over a Wi-Fi network 630. In this particular embodiment, a Wi-Fi and BLUETOOTH™ enabled media content rendering device 623, receives the media output of the BLUETOOTH™ enabled media content source 610 through a BLUETOOTH™ transceiver 616, such that the media content may be re-broadcast over a Wi-Fi network 630 which has more transmission range than BLUETOOTH™ and may accommodate a plurality of media content rendering clients 635/636/637/638 for media content playback. Wi-Fi enabled media content rendering devices 635/636/637/638 may join the Wi-Fi network 630 to receive media content by sending a specialized discovery initiation signal which the Wi-Fi and BLUETOOTH™ enabled media content rendering device 623 uses to, amongst other things, add the new media rendering devices 635/636/637/638 to a list of devices subscribed, and to determine how many channels a media rendering device 635/636/637/638 possesses for example one channel (mono, 635), two channels (stereo, 636), or for example, six channels 637 (surround), or even a plurality of channels which may include video, as may be the case when using a mobile computing device such as a smartphone 638.

An important aspect of multimedia playback is that media content delivery be synchronized, such that dancing, singing or other activities, occur simultaneously, meaning, within very low tolerances, not noticeable to live users of the system 600. The Wi-Fi and BLUETOOTH™ enabled media content rendering device 623 accounts for this by polling all subscribed media rendering devices 635/636/637/638 with a propagation timing signal which, in part, includes its synchronization module's 623z internal clock timestamp. Once broadcast out to all of the subscribed content rendering devices 635/636/637/638, the subscribed content rendering devices synchronization components 635z/636z/637z/638z respond with a propagation time offset response which may include a difference between the synchronization module's 623z timestamp, and each respective media content rendering device's synchronization component 635z/636z/637z/638z internal clock. The largest propagation time offset sent back to the Wi-Fi and BLUETOOTH™ enabled media content rendering device 623 is taken to be the longest signal propagation time on the network 630. Playback at each respective media content rendering device 635/636/637/638 is then offset using an equation (longest propagation offset minus propagation offset of current media content rendering device). Synchronization is denoted within FIG. 6 by a media playback time point associated with each device 623/635/636/637/638, which, in this example, all play their respective content simultaneously at exactly: 00:048:23.927 (to the nearest $1/1000^{th}$ of a second), hence, in a synchronized fashion. Once synchronization is achieved, synchronized playback may be maintained by methods such as, but not limited to, a COMMON EVENT mechanism. Propagation signal to response receipt traversal times may be used to measure network signal propagation times, if needed, for example, due to internal clock time mismatches between subscribed network devices.

It should be appreciated that while reference is made to Internet connectivity using Wi-Fi wireless communication, any data transmission network may be utilized alternately, such as BLUETOOTH™, Ethernet or other wired network connection, cellular radio connection such as CDMA or GSM networks, or any other such appropriate connectivity means for devices to transmit and receive media content. In this manner, the system 100/300/500/600 and method 200/400/700/800 of the invention may be utilized to facilitate synchronous playback according to the invention regardless of a particular user's network configuration, and without requiring specific capabilities from a user's device or devices, and the invention may be readily implemented with a wide variety of arrangements and devices used simultaneously or interchangeably, without impacting utilities described herein.

It may be possible for different playback devices to utilize different network connectivity means (such as BLUETOOTH™ or Wi-Fi, for example) to connect to a network, and receive or request different media from other playback devices. For example, one media file may be played to devices via a BLUETOOTH™ connection, while different media is broadcast to devices over a Wi-Fi connection, such that a variety of devices may connect to a variety of networks and play a variety of media content, in various combinations according to a particular desired arrangement or use case.

DETAILED DESCRIPTION OF EXEMPLARY EMBODIMENTS

Figure 2:
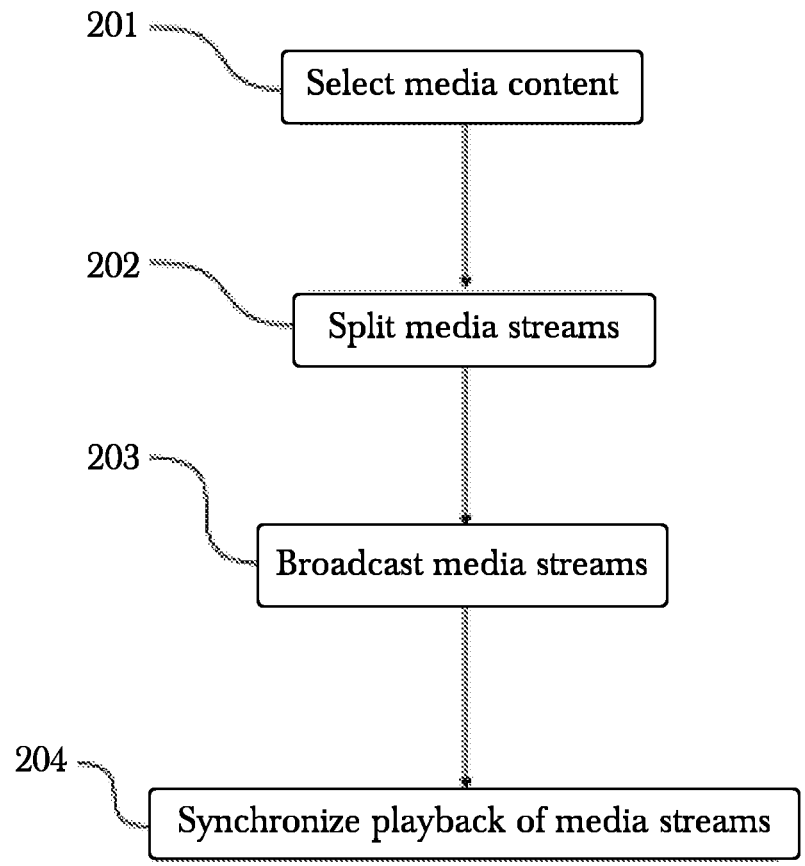
FIG. 2 is a method flow diagram, illustrating an exemplary method for providing synchronized media broadcast to multiple receiver devices, according to another preferred embodiment of the invention.

FIG. 2 is a method flow diagram, illustrating an exemplary method 200 for providing synchronized media broadcast to multiple receiver devices, according to another preferred embodiment of the invention. In a first step 201, media content may be selected and provided for viewing by a media source device, such as a media player or television set top box. In a next step 202, the media content may be split for viewing on multiple receiver devices, for example by separating different audio channels (as are common in stereo, surround sound, or other multichannel audio configurations) or by separating an audio media stream from a corresponding video content stream (such as would be present in a movie, for example). In a next step 203, media streams may be broadcast individually or jointly to media receiver devices such as media players, televisions, mobile electronics, speakers, or other appropriate media devices according to a particular media type or use case. For example, a movie may be separated into video and audio streams in a previous step 202, the video stream being broadcast to a television and the audio stream being broadcast separately to a speaker. Another example may be the broadcast of selected audio channels to one media device, for example sending stereo English dialog to a speaker system, while simultaneously broadcasting a different audio stream or combination of streams to another device, such as sending a monaural foreign-language audio stream to a set of headphones being used by a non-English speaker wishing to view the same movie at the same time. In this manner, it can be appreciated that a variety of uses become possible by combining various media content streams in various arrangements, and sending them to various devices according to a particular desired operation. In a final step 204, the media receiver devices may operate media synchronization systems to ensure media is played in a synchronous fashion and with low latency.

Figure 4:
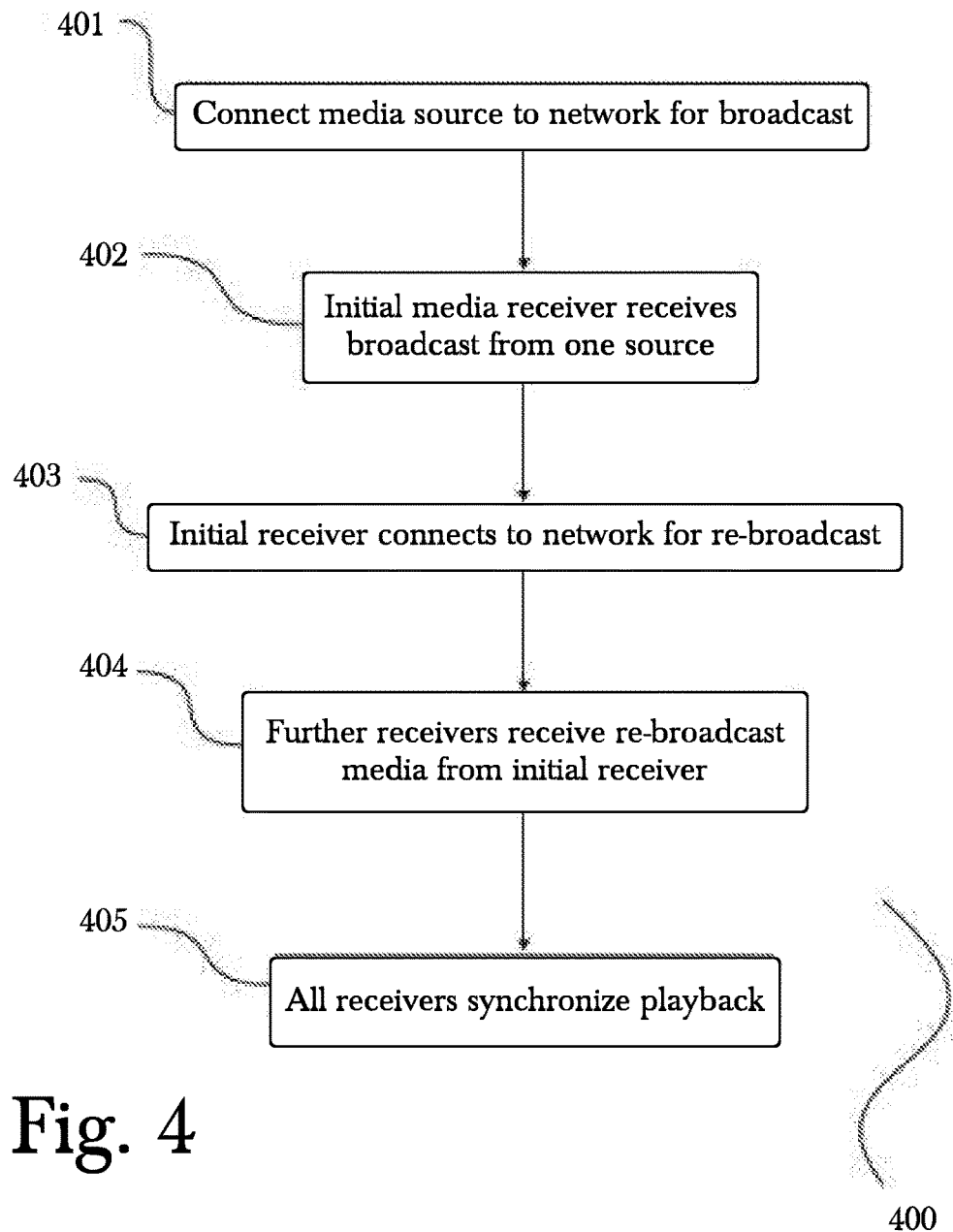
FIG. 4 is a method flow diagram, illustrating an exemplary method for media playback over a large network using multiple transmission protocols, according to another preferred embodiment of the invention.

FIG. 4 is a method flow diagram, illustrating an exemplary method 400 for media playback over a large network using multiple transmission protocols, according to another preferred embodiment of the invention. In an initial step 401, a media source may connect to a network for media broadcast, such as a wired or wireless connection to the Internet or a local area network (LAN), or a direct connection to a networked playback device such as a television (TV) or media rendering devices, such as a speaker or earphones. In a next step 402, a playback device may receive media content from the media source, for example a networked television receiving a video media stream. In a next step 403, the first playback device may then connect to a network (again, such as a wired or wireless Internet connection, or a connection to a LAN, or directly to another network-capable playback device) to perpetuate the broadcast of media content that it receives. In this manner, the first playback device then broadcasts the media content to a network or to other playback devices which may not otherwise receive the media content directly from the media source, for example due to technological incompatibility or transmission distance. In a next step 404, additional playback devices may receive media content from the first playback device, such as via a wired or wireless network or a direct connection between devices, for example to extend the range of a network by enabling devices to directly broadcast media content to one another without relying on a central hub or router that might limit a broadcast range. In a final step 405, playback devices may coordinate their playback with one another such as by supplying each other with timing information, or by coordinating with a singular timing source (for example, the media source or the first playback device) that may supply timing information such that all devices are kept in sync during playback.

Figure 7:
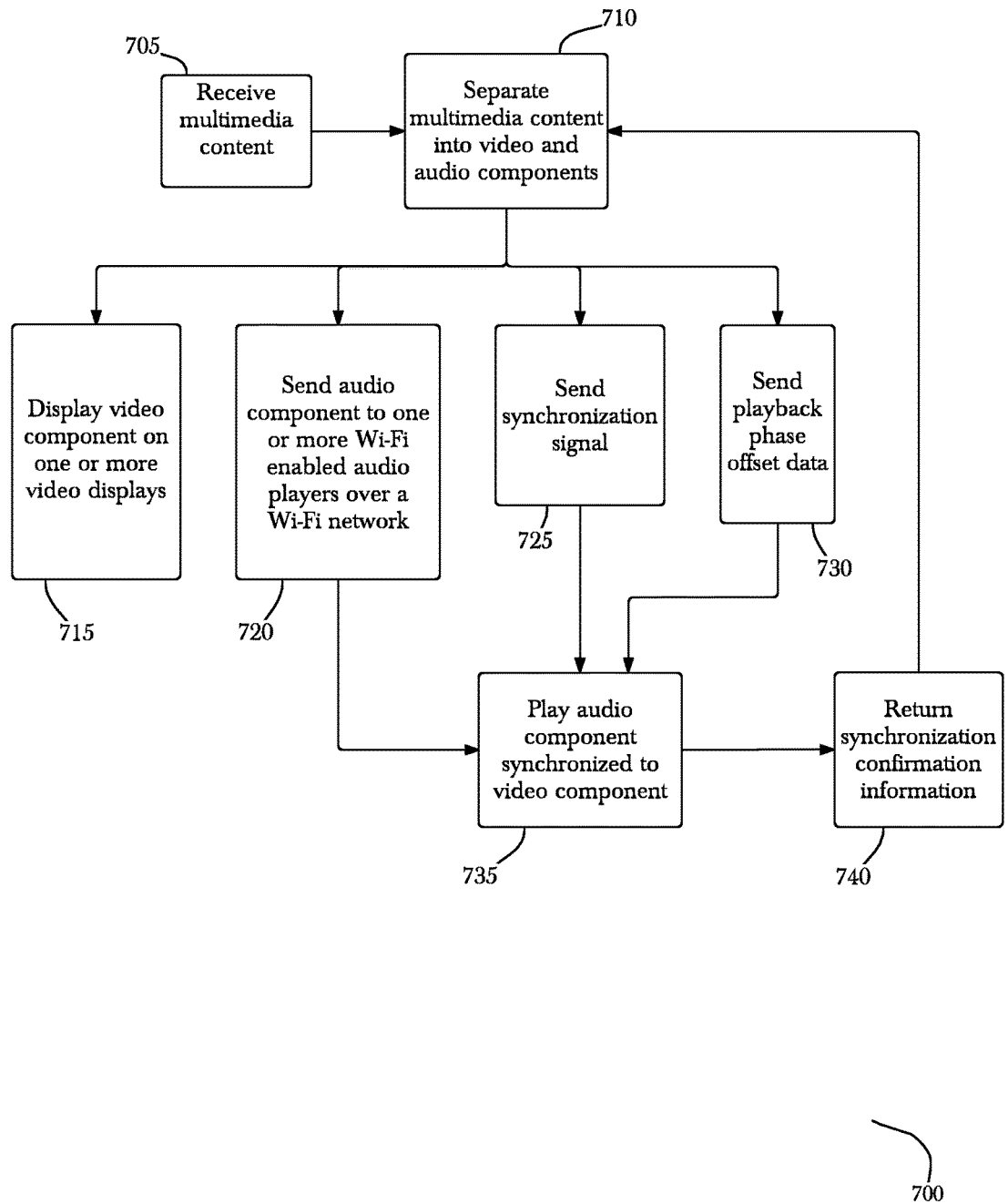
FIG. 7 is a flow diagram, illustrating an exemplary method for playing media content on a plurality of Wi-Fi connected rendering devices synchronized with media content being rendered on a centralized display device, according to a preferred embodiment of the invention.

FIG. 7 is a flow diagram illustrating an exemplary method 700 for playing audio media content 501 on a plurality of Wi-Fi connected audio rendering devices 535/536/537/538 synchronized with video being rendered on a video display 520 through a centralized playback control device, 510, synchronized with video media content 502 being rendered on a centralized video display 520 device, according to a preferred embodiment of the invention. Multimedia content 503 data is received 705 from one of a plurality of possible sources which may include, but are not limited to, satellite 511, cable 513, cloud repository 512 or persistent storage such as flash memory or hard disk drive or other database 518, either locally or connected by a network 530. The playback control device, 510 separates 710 multimedia content 503 into a video component 502 and an audio component, as audio media content 501. Display 715 of the video component 502 on one or more directly connected video display 520 is timed to correspond perfectly with audio playback by sending audio component to one or more Wi-Fi enabled audio players over a Wi-Fi network 720. At the same time, synchronization module 516 sends a propagation synchronization signal 725 to each audio content rendering device 535/536/537/538 which may be subscribed to network 530 to ensure synchronization, and playback phase offset data is sent 730 to each audio content rendering device 535/536/537/538. Upon receipt of the signal propagation synchronization message all participating audio rendering devices play audio component synchronized to video component 735 before returning synchronization information 740 back for additional separation 710 where synchronization information may include clock offset data from the playback control device 510. Offsets determined by step 730 may be used to control commencement of streaming audio media content 501 to control sending the audio component to one or more Wi-Fi enables audio players over a Wi-Fi network 720, such that all audio rendering devices play the audio component synchronized to video component 735. Once synchronization is established, maintenance may be achieved by methods such as, but not limited to, a common event mechanism.

Figure 8:
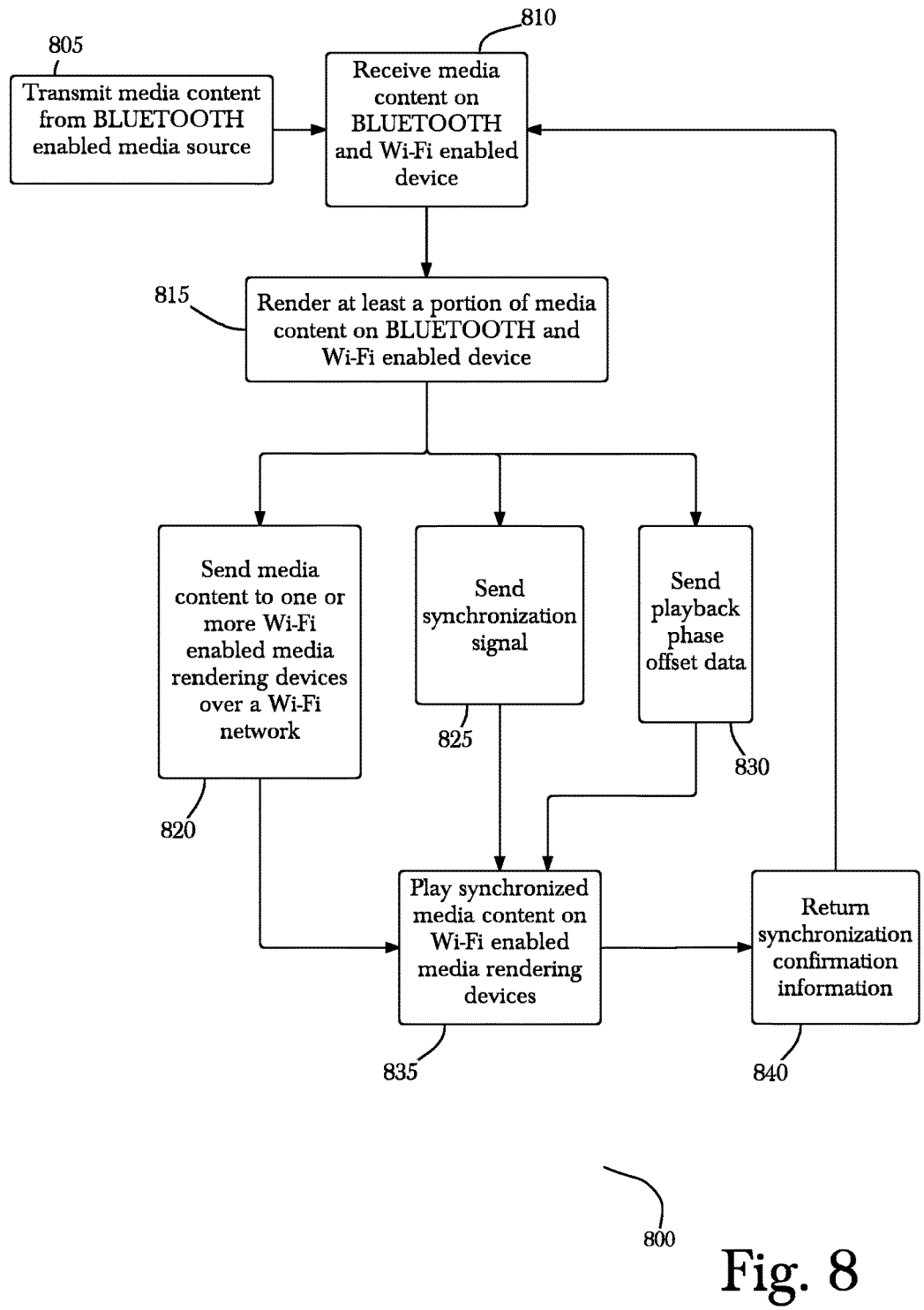
FIG. 8 is a flow diagram, illustrating an exemplary method for playing media content from a BLUETOOTH™ enabled content source on a plurality of BLUETOOTH™ enabled and Wi-Fi connected rendering devices, synchronized to play at the same time, according to another preferred embodiment of the invention.

FIG. 8 is a flow diagram, illustrating an exemplary method for playing media content from a Wi-Fi and BLUETOOTH™ enabled content source on a plurality of Wi-Fi connected rendering devices, synchronized to play at the same time, according to another preferred embodiment of the invention.

FIG. 8 is a flow diagram illustrating an exemplary method 800 for playing media content from a BLUETOOTH™ enabled media content source 610 through a BLUETOOTH™ and Wi-Fi enabled media rendering device 623 on a plurality of BLUETOOTH™ connected rending devices, such as speakers 624A/B, wireless ear buds 624C or wireless earphones 624D and over a network 630 on Wi-Fi connected media rendering receivers 635/636/637/638, synchronized to all play the media content simultaneously, according to a preferred embodiment of the invention Media content may be transmitted 805 from a BLUETOOTH™ enabled media content source 610, and is received 810 through a BLUETOOTH™ and Wi-Fi enabled media rendering device 623, configured to render at least a portion of media content 815 on BLUETOOTH™ enabled devices, such as BLUETOOTH™ speakers 624A/B and be transmitted 820 to one or more Wi-Fi enabled media devices 635/636/637/638 over a Wi-Fi network 630. Synchronization component 618 sends a synchronization signal 825 to each media content rendering device 623/635/636/637/638, some of which may be subscribed to network 630, to ensure synchronization, and playback phase offset data is sent 830 to each media content rendering device 623/635/636/637/638. Upon receipt of a signal propagation synchronization message 825, all participating media rendering devices play media content synchronized 835 before returning synchronization information 840 back for additional separation 810, where synchronization information may include clock offset data from the BLUETOOTH™ and Wi-Fi enabled media rendering device 623. Offsets determined by step 830 may be used to control commencement of streaming multimedia content to control sending media content to one or more Wi-Fi enabled media rendering devices over a Wi-Fi network 820, such that all media rendering devices play the components synchronized 835. Once synchronization is established, maintenance may be achieved by methods such as, but not limited to, a common event mechanism.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 9:
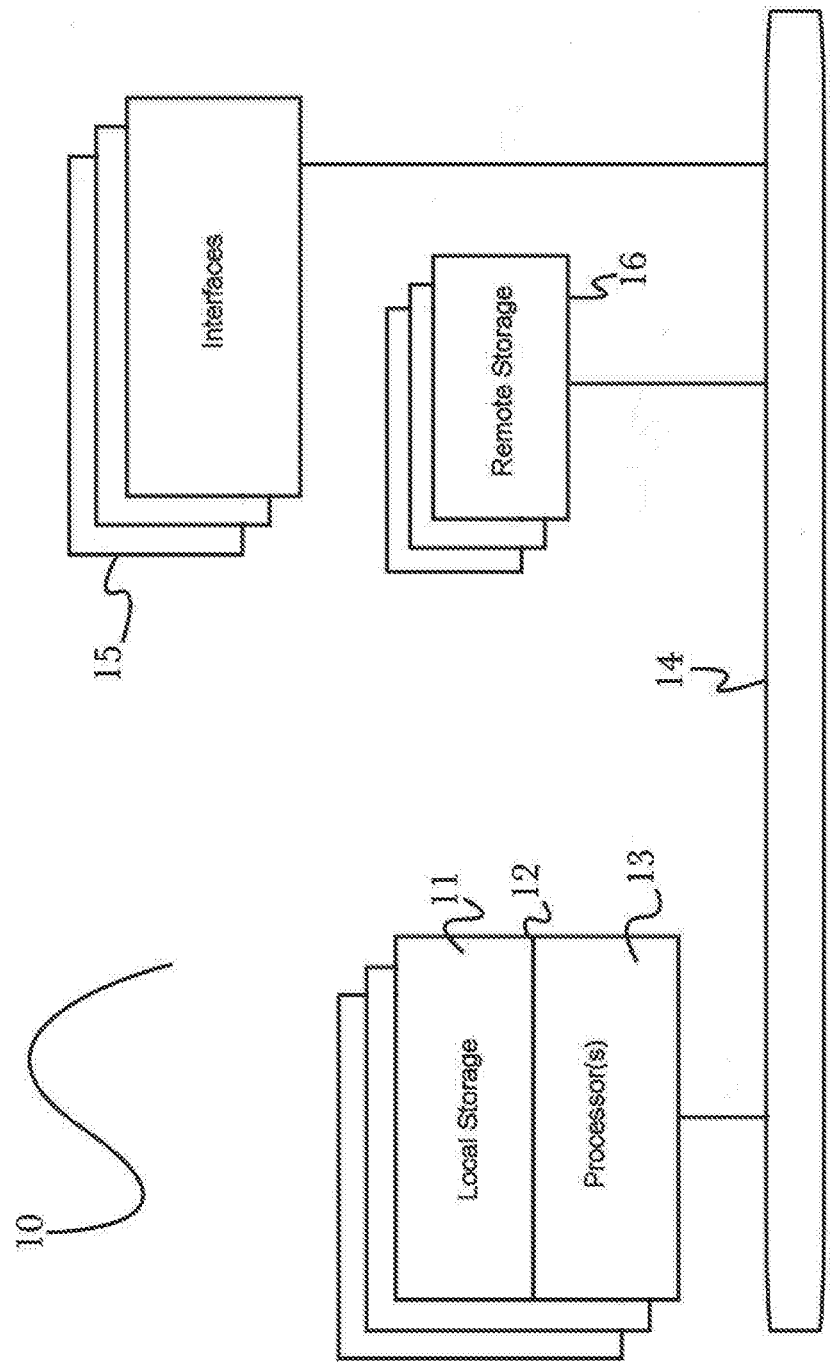
FIG. 9 is a block diagram, illustrating an exemplary hardware architecture of a computing device used in an embodiment of the invention.

Referring now to FIG. 9, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 9 illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 10:
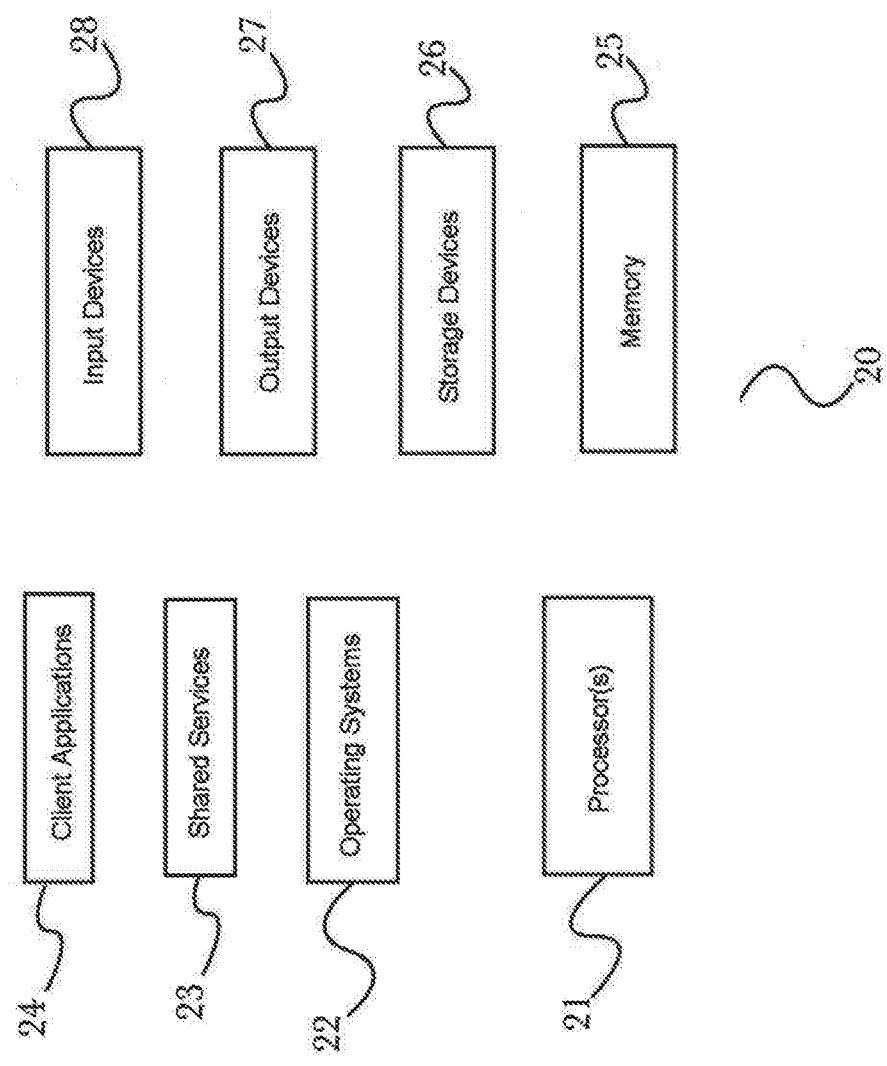
FIG. 10 is a block diagram, illustrating an exemplary logical architecture for a client device, according to an embodiment of the invention.

In some embodiments, systems according to the present invention may be implemented on a standalone computing system. Referring now to FIG. 10, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of MICROSOFT WINDOWS™ operating system, APPLE OSX™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 9). Examples of storage devices 26 include flash memory, magnetic hard drive, CD-ROM, and/or the like.

Figure 11:
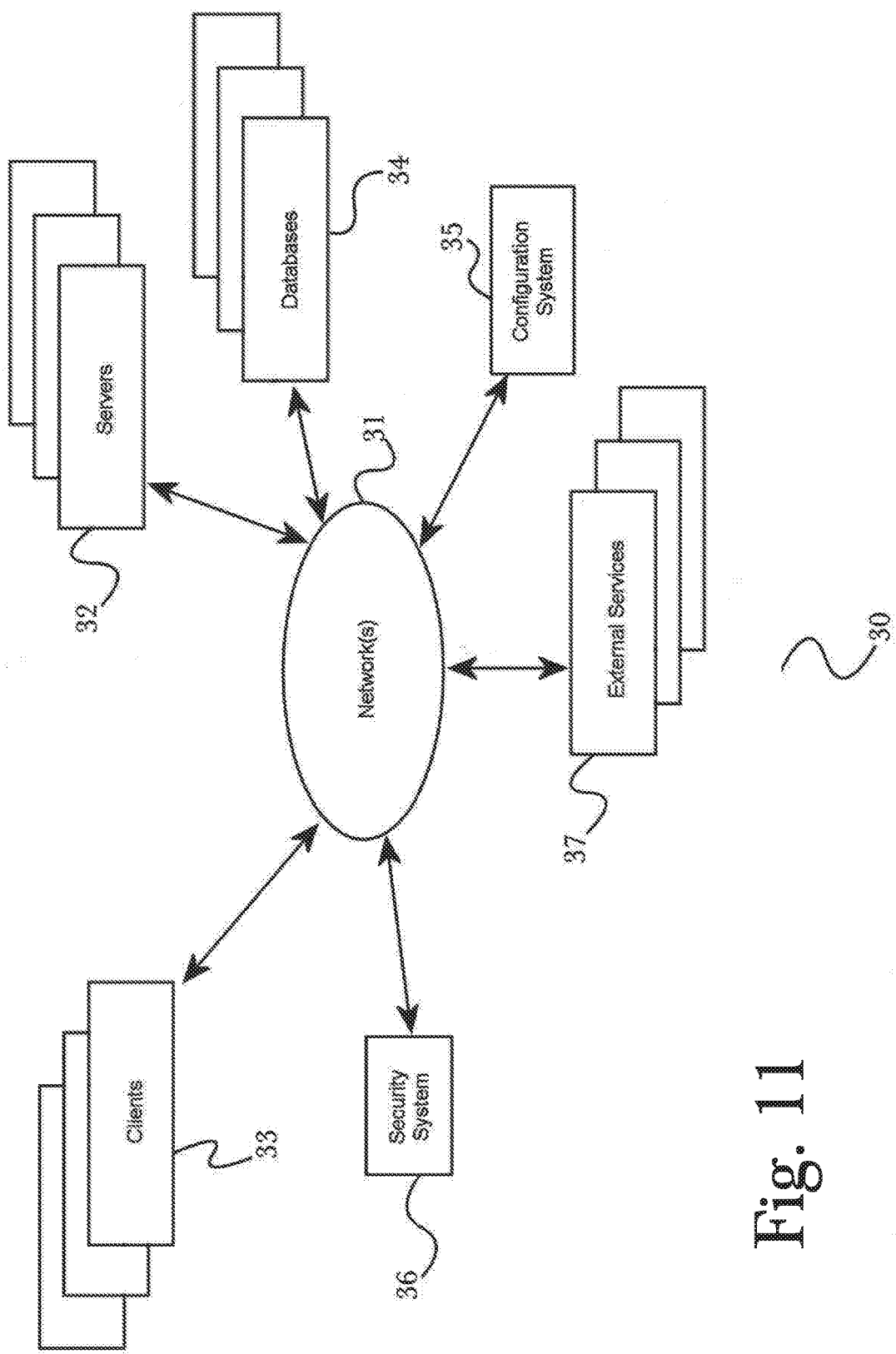
FIG. 11 is a block diagram, showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 11, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated in FIG. 10. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 12:
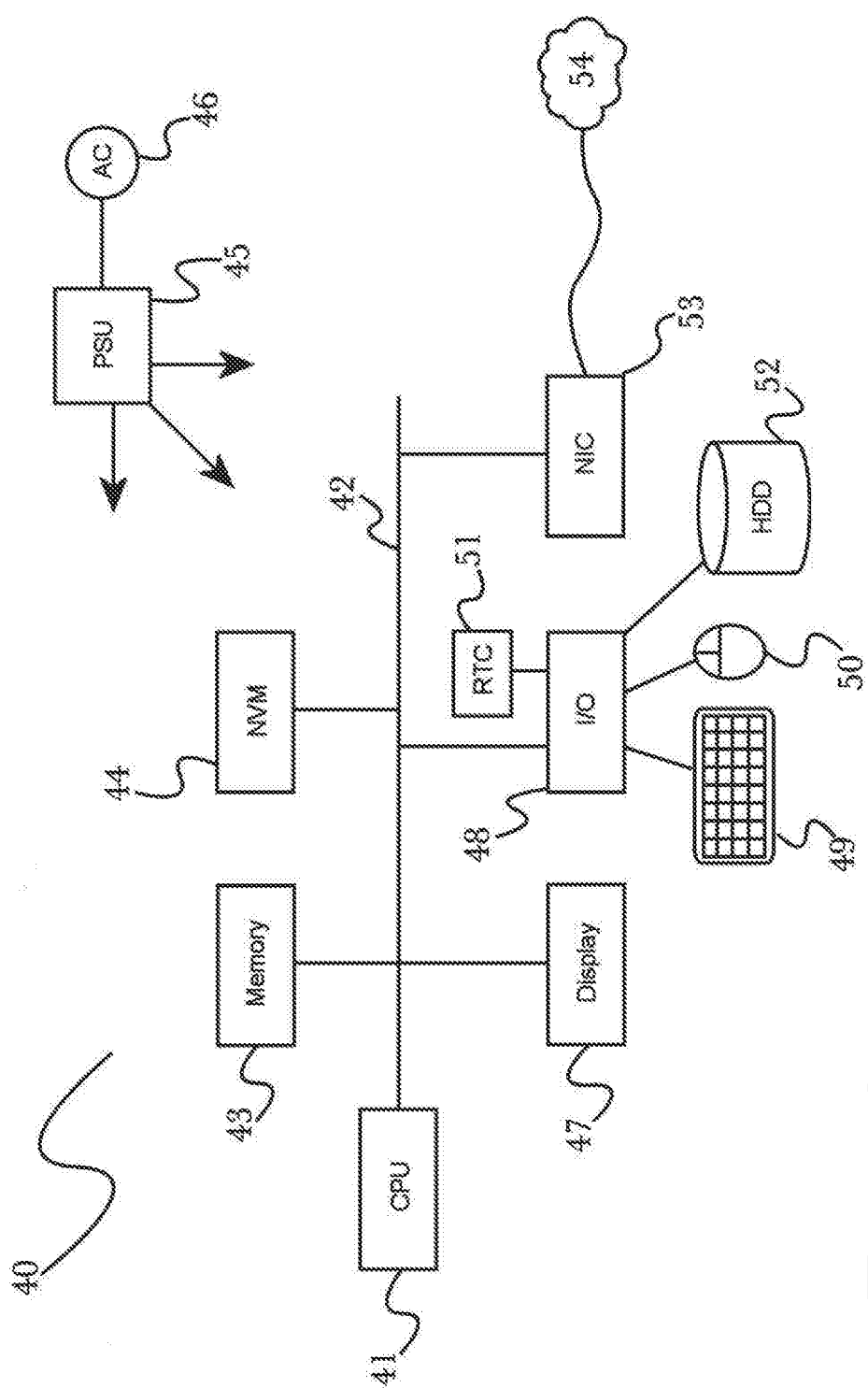
FIG. 12 is another block diagram, illustrating an exemplary hardware architecture of a computing device used in various embodiments of the invention.

FIG. 12 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

The skilled person will be aware of a range of possible modifications of the various embodiments described above. Accordingly, the present invention is defined by the claims and their equivalents.

What is claimed is:

1. A system for media rebroadcasting for synchronized rendering across multiple devices, comprising:
    a first media rendering device comprising at least a processor, a memory, and a plurality of programming instructions stored in the memory and operating on the processor, wherein the programmable instructions, when operating on the processor, cause the processor to:
        receive media content via a network;
        rebroadcast at least a portion of the media content via the network;
        transmit a synchronization signal via the network; and
        render at least a portion of the media content; and
    a synchronization module operating on the first media device and configured to produce a synchronization signal based at least in part on an internal processor clock of the first media rendering device;
    wherein a plurality of additional media rendering devices receive at least a portion of the media content and the synchronization signal via the network, and are configured to render the media content in synchronization with the first media rendering device, the synchronization being based at least in part on the synchronization signal.

2. The system of claim 1, wherein the network interface comprises a wireless network interface.

3. The system of claim 2, wherein the wireless network interface uses WiFi communication.

4. The system of claim 2, wherein the wireless network interface uses BLUETOOTH™ communication.

5. The system of claim 1, wherein the media source comprises a storage device.

6. The system of claim 5, wherein the storage device is a local storage device operated by the first media rendering device.

7. The system of claim 1, wherein the media source is a media streaming device.

8. The system of claim 1, wherein the media source is a network-based source transmitting media via a network.

9. The system of claim 7, wherein the network-based source is an online streaming service.

10. The system of claim 1, wherein the media content comprises audio content.

11. The system of claim 1, wherein the media content comprises video content.

12. The system of claim 10 and claim 11, wherein the audio and video content are individually rebroadcast to separate second media rendering devices.

13. A method for media rebroadcasting for synchronized rendering across multiple devices, comprising the steps of:
    receiving, at a first media rendering device, media content via a network;
    producing, using a synchronization module operating on the first media rendering device, a synchronization signal based at least in part on an internal processor clock of the first media rendering device;
    rebroadcasting at least a portion of the media content via the network;
    transmitting the synchronization signal via the network;
    rendering at least a portion of the media content;
    receiving, at a plurality of additional media rendering devices, at least a portion of the media content and the synchronization signal; and
    rendering the received media content in synchronization with the first media rendering device, the synchronization being based at least in part on the synchronization signal.

* * * * *